(12) United States Patent
MacNee, III et al.

(10) Patent No.: US 7,320,499 B2
(45) Date of Patent: Jan. 22, 2008

(54) MOVABLE ROOF DRIVE SYSTEM

(75) Inventors: Arthur L. MacNee, III, Southgate, MI (US); Kurt Theisen, Wyandotte, MI (US)

(73) Assignee: Specialty Vehicle Acquisition Corp., Los Angeles, CA (US)

(*) Notice: Subject to any disclaimer, the term of this patent is extended or adjusted under 35 U.S.C. 154(b) by 26 days.

(21) Appl. No.: 11/260,747

(22) Filed: Oct. 27, 2005

(65) Prior Publication Data

US 2007/0096510 A1   May 3, 2007

(51) Int. Cl.
*B60J 7/06*   (2006.01)
*B60J 7/057*   (2006.01)

(52) U.S. Cl. .................. 296/219; 296/223; 296/107.19

(58) Field of Classification Search ................ 296/219, 296/214, 223, 98, 100.12, 107.19, 107.09
See application file for complete search history.

(56) References Cited

U.S. PATENT DOCUMENTS

| | | | |
|---|---|---|---|
| 2,895,765 A * | 7/1959 | Dimitrij | 296/117 |
| 3,568,366 A * | 3/1971 | Carella | 49/349 |
| 4,273,377 A | 6/1981 | Alexander | |
| 4,611,848 A | 9/1986 | Romano | |
| 4,795,206 A * | 1/1989 | Adams | 296/98 |
| 4,867,220 A | 9/1989 | Matsumoto et al. | |
| 4,893,868 A | 1/1990 | Miller et al. | |
| 4,923,244 A | 5/1990 | Clenet | |
| 4,925,238 A | 5/1990 | Thaler | |
| 5,018,784 A | 5/1991 | Yokouchi et al. | |
| 5,052,747 A | 10/1991 | Kubota et al. | |
| 5,054,847 A | 10/1991 | Asoh et al. | |
| 5,129,677 A | 7/1992 | Marshall | |
| 5,142,824 A * | 9/1992 | Le Compagnon et al. | 49/349 |
| 5,253,914 A | 10/1993 | Biancale | |
| 5,310,241 A | 5/1994 | Omoto et al. | |
| 5,498,057 A | 3/1996 | Reina et al. | |
| 5,501,501 A * | 3/1996 | White et al. | 296/64 |
| 5,709,426 A | 1/1998 | DeRees et al. | |
| 5,893,603 A | 4/1999 | Viertel et al. | |
| 5,944,378 A | 8/1999 | Mather et al. | |
| 6,015,184 A | 1/2000 | Ewing et al. | |
| 6,039,383 A | 3/2000 | Jambor et al. | |
| 6,161,893 A | 12/2000 | Ewing et al. | |
| 6,179,034 B1 | 1/2001 | Fuss | |
| 6,179,373 B1 | 1/2001 | Bohm et al. | |
| 6,196,616 B1 | 3/2001 | Muszynski | |
| 6,220,646 B1 | 4/2001 | Lamela | |
| 6,398,296 B1 | 6/2002 | Mayer | |
| 6,419,308 B1 | 7/2002 | Corder et al. | |
| 6,428,090 B1 | 8/2002 | Reinsch | |
| 6,435,595 B1 | 8/2002 | Chenowth | |
| 6,435,606 B1 | 8/2002 | Miklosi et al. | |
| 6,497,448 B1 | 12/2002 | Curtis et al. | |
| 6,546,943 B2 | 4/2003 | Lin | |
| 6,582,007 B2 | 6/2003 | Gothier et al. | |
| 6,592,178 B2 | 7/2003 | Schober et al. | |
| 6,637,286 B2 | 10/2003 | Friedrich et al. | |
| 6,652,023 B2 | 11/2003 | Manders et al. | |
| 6,676,192 B2 | 1/2004 | Marold et al. | |
| 6,786,540 B2 * | 9/2004 | Friedrich et al. | 296/223 |
| 6,860,549 B2 | 3/2005 | Engelgau | |
| 7,051,781 B2 * | 5/2006 | Grimm et al. | 160/265 |

* cited by examiner

*Primary Examiner*—Dennis H. Pedder
(74) *Attorney, Agent, or Firm*—Harness, Dickey & Pierce, P.L.C.

(57) ABSTRACT

An automotive vehicle system includes a movable member and a belt-driven drive wheel that is operable to engage and disengage with the movable member and cause the movable member to move between positions. A tensioning member is operable to bias a movable roof member into contact with a wheel which is operable to engage with and selectively drive the roof member between positions.

17 Claims, 7 Drawing Sheets

MOVABLE ROOF DRIVE SYSTEM

BACKGROUND AND SUMMARY OF THE INVENTION

Movable members have been employed in automotive vehicles in a variety of locations. For example, movable members can include sunroof panels that are movable from a closed to an open position, full width roof panels movable between extended and retracted positions, pliable roof covers or roof covers having pliable portions, and the like. To move these movable members between positions, various mechanisms and/or structures can be used. These various mechanisms and/or structures may be complicated and/or expensive. Thus, it would be advantageous if a mechanism and/or structure could be employed that is of a lower cost and/or a simplified construction. It would be further advantageous if such a mechanism were capable of allowing infinite adjustment of the position of the movable member between extreme positions. Moreover, it would be advantageous if the power requirements to drive the mechanism are reduced or diminished.

In accordance with the present invention, an automotive vehicle system includes a movable member and a belt-driven drive wheel that is operable to engage and disengage with the movable member and cause the movable member to move between positions. In another aspect of the present invention, a roof cover having a pliable portion is driven between extended and retracted positions by at least one wheel that is operable to engage with and selectively drive the roof cover. In yet another aspect of the present invention, a tensioning member is operable to bias a roof member into contact with a wheel which is operable to engage with and selectively drive the roof member between positions.

The present invention is advantageous in that it provides a simplified construction for a driving system to move a movable member between positions. The system allows the position of the movable member to be controlled and positioned in an infinite number of locations between extreme positions. Furthermore, the present invention has a low power demand to drive the roof member between the positions. The drive system of the present invention can be used on a variety of automotive vehicles, such as cars, trucks, boats and the like. Additional advantages and features of the present invention will become apparent from the following description and appended claims taken in conjunction with the accompanying drawings.

Moreover, further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1A:
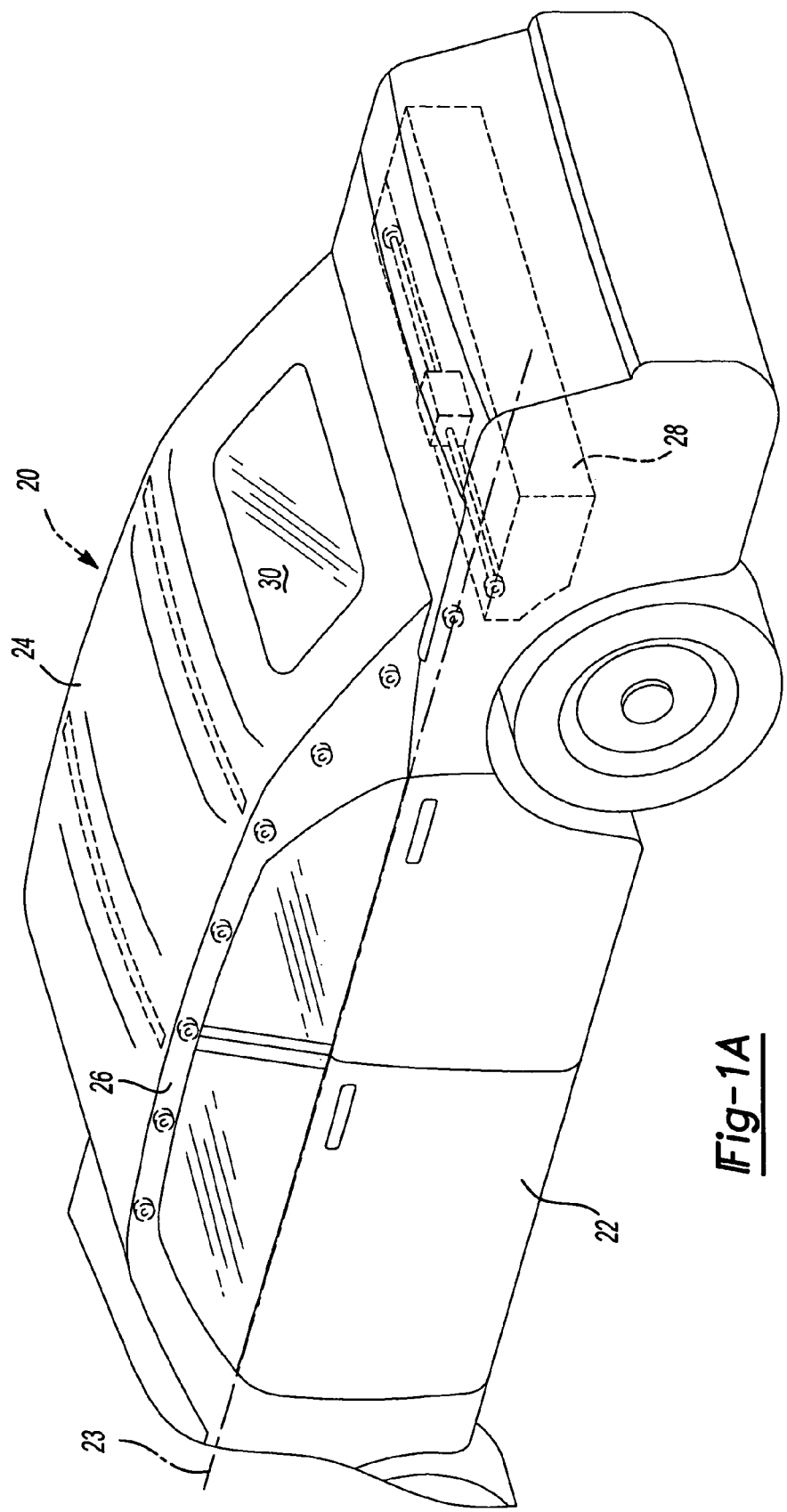
FIGS. 1A-1C are perspective views of a movable roof drive system according to the principles of the present invention moving a roof member from an extended position through an intermediate position and into a retracted position respectively.
Figure 1B:
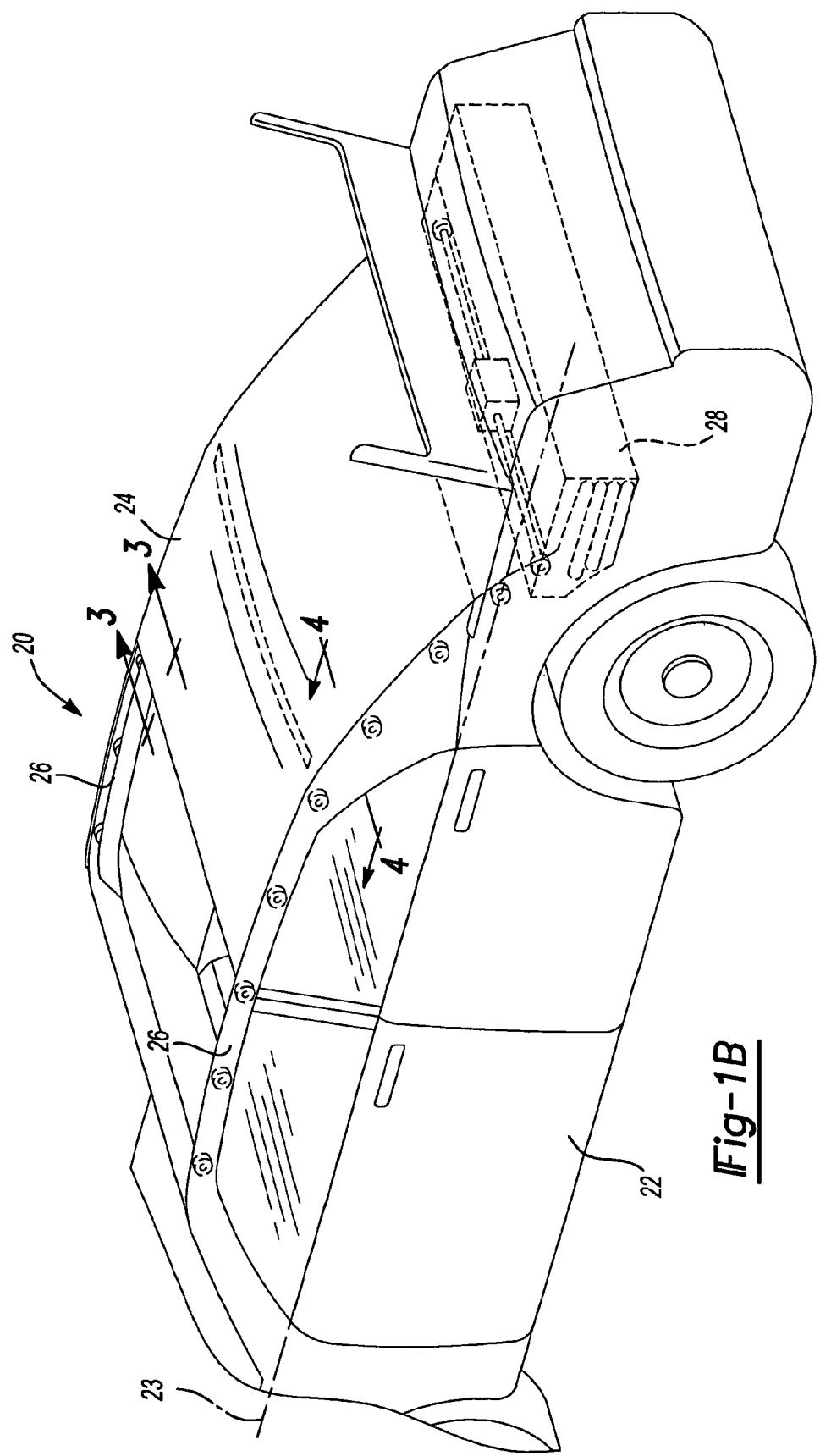
Figure 1C:
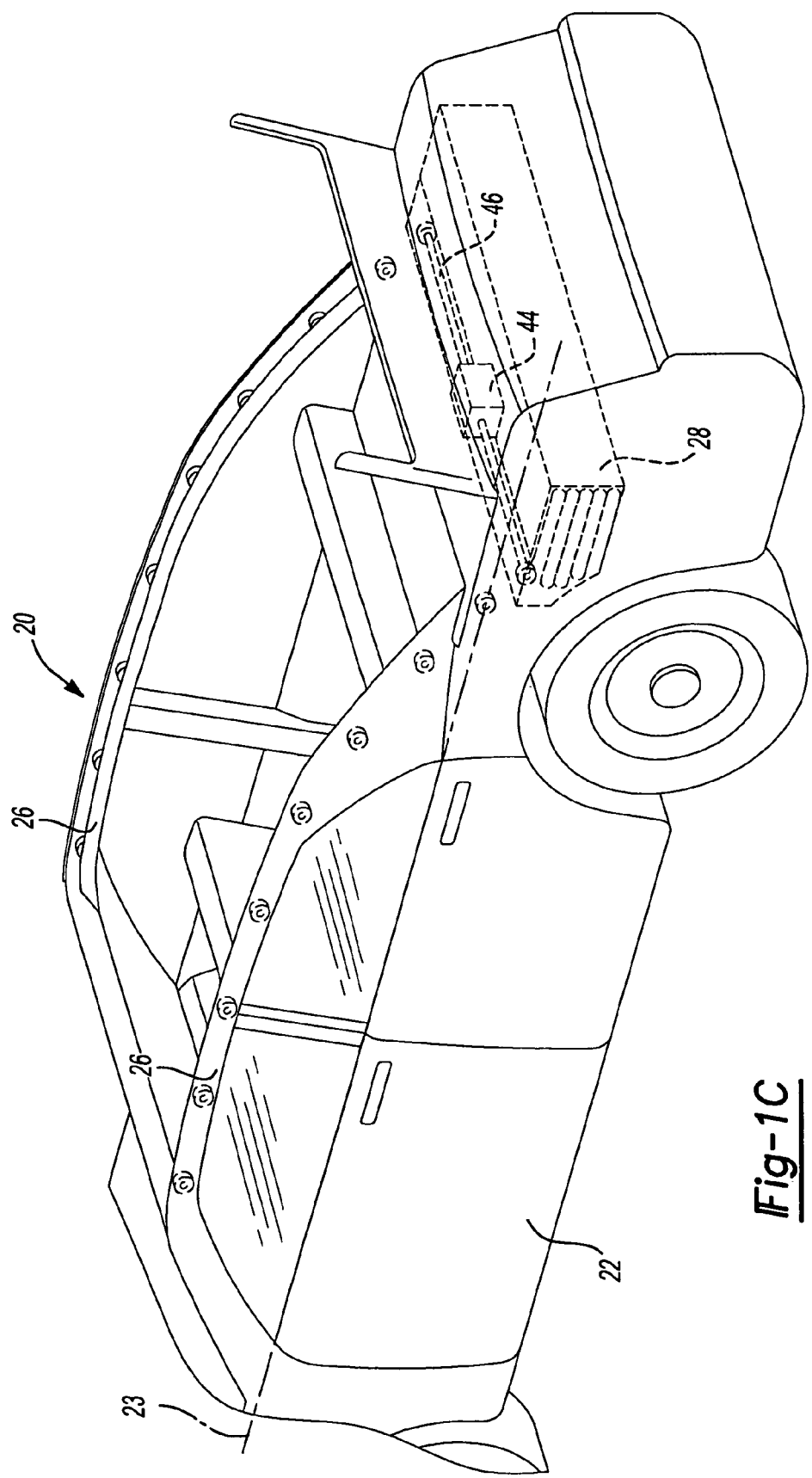

A movable roof drive system 20 according to the principles of the present invention is shown on an automotive vehicle 22 having a beltline 23 in FIGS. 1A-1C. Drive system 20 is operable to move a movable roof member 24 between two extreme positions. In the embodiment shown, movable roof member 24 is a soft-top roof that extends between fixed longitudinal roof rails 26. Drive system 20 moves roof 24 from a fully extended position, as shown in FIG. 1A, through intermediate positions, such as the position shown in FIG. 1B, to a retracted or stowed position below beltline 23, as shown in FIG. 1C. Roof 24 can be positioned at any location between the fully-extended position and the retracted position. Drive system 20 thereby enables roof 24 to be infinitely positioned between these two extreme positions.

Figure 5:
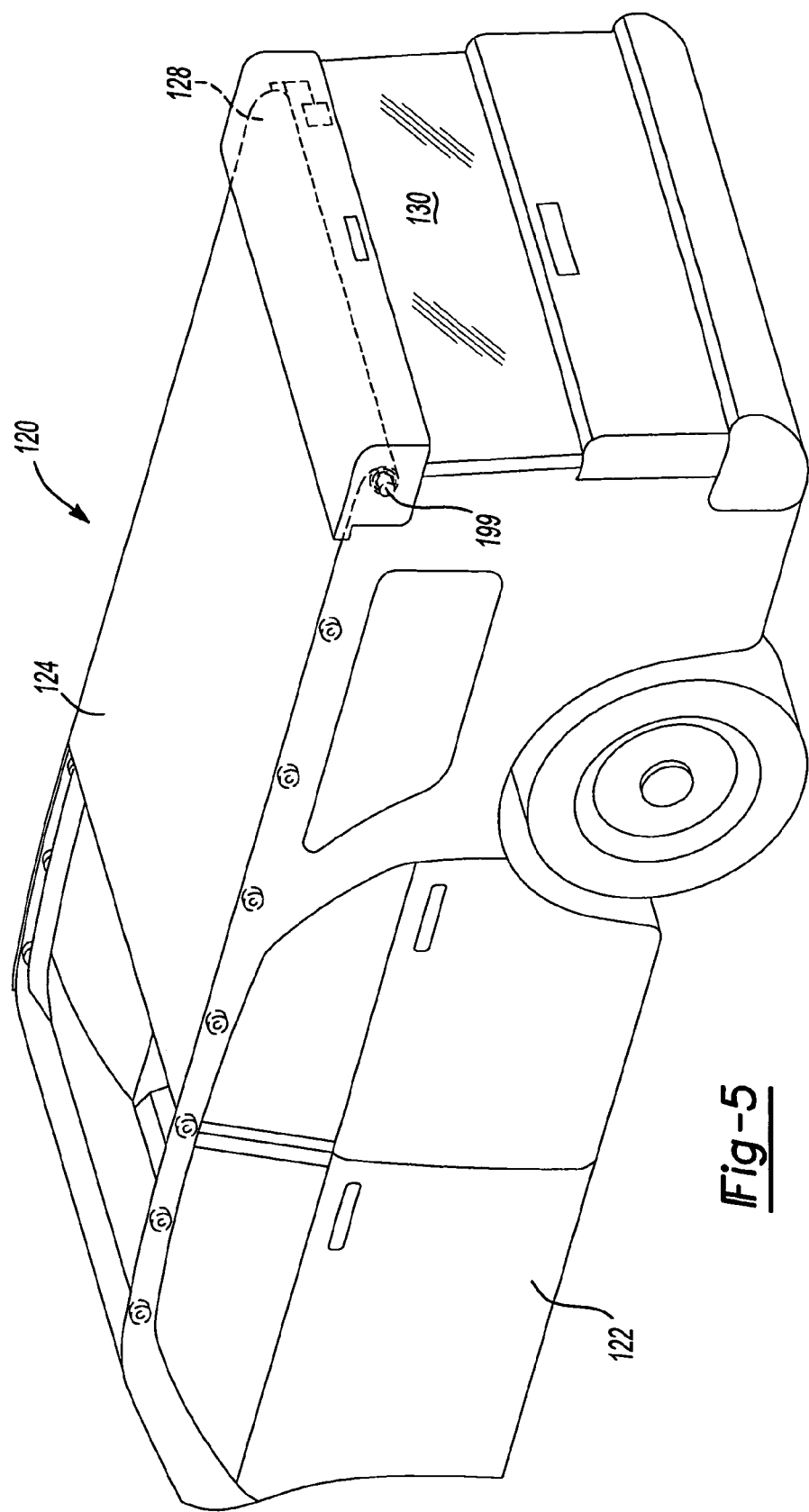
FIG. 5 is a perspective view of an alternate embodiment of the movable roof drive system according to the principles of the present invention.

Roof 24 is primarily a pliable roof made from pliable materials, such as cloth, canvas, polymers, batting, and the like. That is, roof 24 can be easily folded upon itself, as shown in FIG. 1C, or wrapped/rolled upon itself, as shown in FIG. 5. Roof 24 may, however, have portions that are not pliable or even rigid. For example, roof 24 may include battens to provide a desired shape/contour or to stiffen/reinforce the roof. Additionally, rigid panels (not shown), exposed or covered, can also be included in roof 24.

In the embodiment shown in FIGS. 1A-1C, roof 24 folds upon itself as it is retracted into a stowage compartment 28 aft of a seating area of vehicle 22. Roof 24 may include living hinges, areas of reduced thickness, or internal hinges or similar structures, or the like to facilitate the folding of roof 24 upon itself within stowage compartment 28. Roof 24 may also include a soft or rigid backlight 30.

Figure 2:
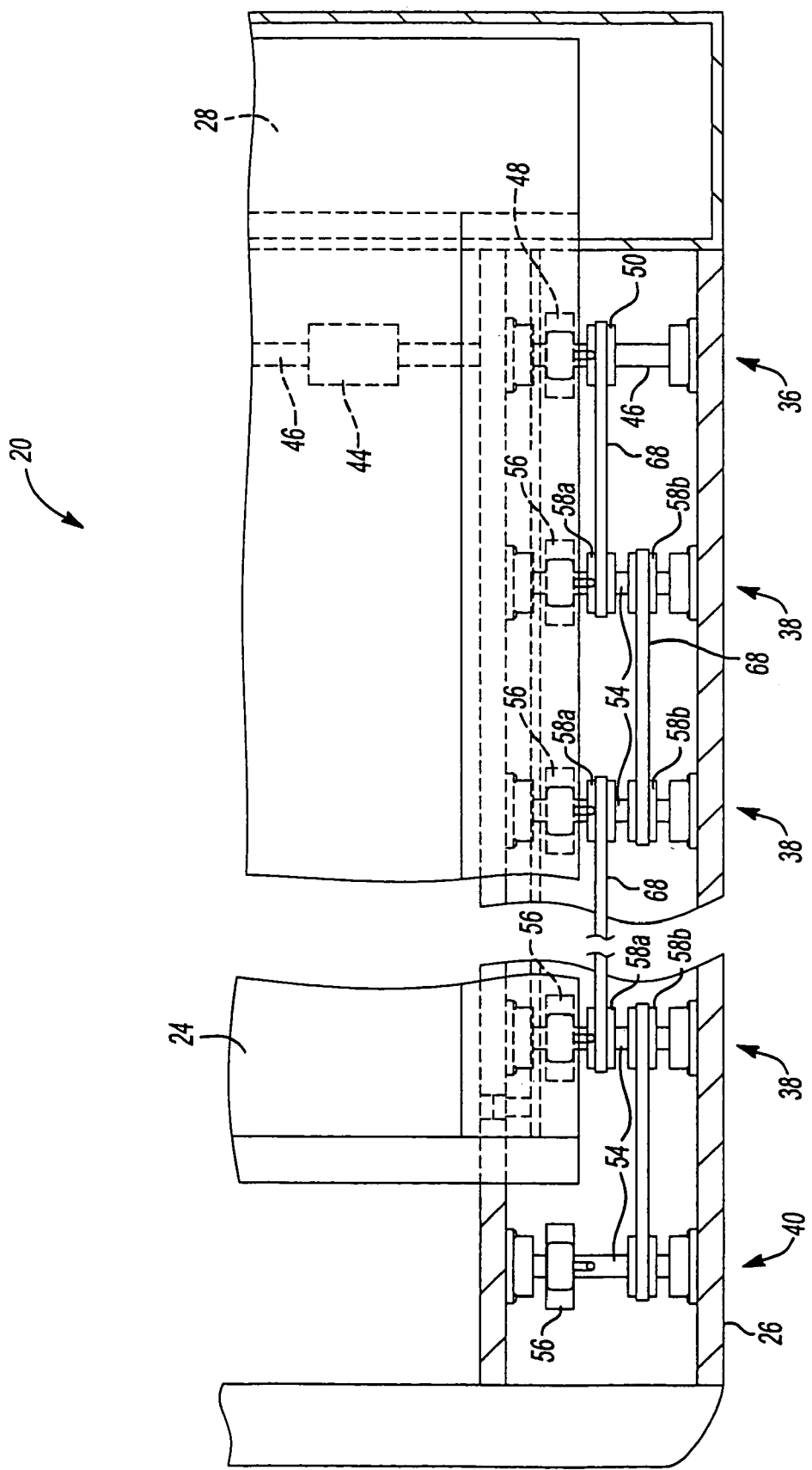
FIG. 2 is a fragmented cutaway top plan view of a portion of the movable roof drive system of FIG. 1 with the movable roof member removed.

Referring now to FIG. 2, a fragmented top view of a portion of drive system 20 is shown. Drive system 20 is substantially symmetrical about a longitudinal fore and aft center line (not shown) of vehicle 22. Only the left side of drive system 20 is shown and described with reference to FIG. 2. It should be appreciated that the right side is essentially a mirror image of the left. In this view, portions of roof rail 26, the tensioning devices (described below) and roof 24 are removed for ease of illustration and explanation.

Drive system 20 includes a rearmost drive assembly 36, a plurality of longitudinally spaced apart intermediate drive assemblies 38, and a forwardmost drive assembly 40. Rearmost drive assembly 36 includes a motor 44, such as an electric motor, that is operable to rotate a drive shaft 46. A drive wheel 48 is fixed to drive shaft 46. A sheave 50 is also fixed to drive shaft 46 outboard of drive wheel 48. Drive wheel 48 and sheave 50 rotate with rotation of drive shaft 46.

Each intermediate drive assembly 38 includes a shaft 54, a drive wheel 56, and two sheaves 58a, 58b. Shaft 54 is laterally secured at both ends to roof rail 26 and can be disposed in bushings, bearings or the like. Shaft 54 can rotate relative to roof rail 26. Drive wheel 56 and sheaves 58a, 58b are fixed to shaft 54 such that they all rotate together. Forwardmost drive assembly 40 is substantially the same as intermediate drive assembly 38 with one less sheave.

Figure 3:
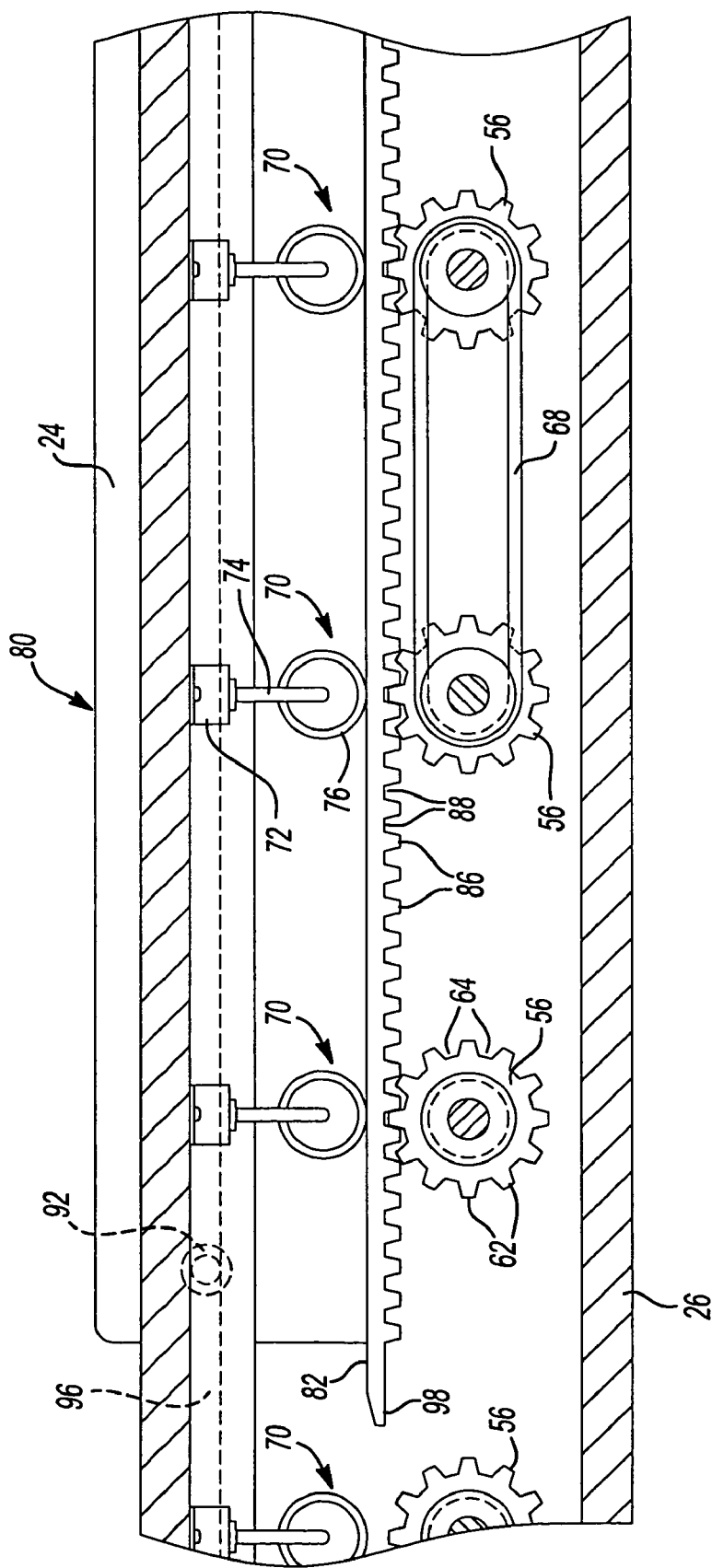
FIG. 3 is a fragmented cutaway view of a portion of the movable roof drive system along line 3-3 of FIG. 1B showing the roof member and the engagement with the movable roof drive system.

Referring to FIG. 3, each drive wheel 48, 56 has a plurality of teeth 62 with recesses 64 disposed therebetween along the outer surface. Teeth 62 and recesses 64 engage with complementary teeth and recesses on roof 24, as described below. The engagement between drive wheels 48, 56 and roof 24 allows the rotation of drive wheels 48, 56 to be translated into motion of roof 24, as described below.

Referring back to FIG. 2, a plurality of belts 68 couple or interconnect each drive assembly 36, 38, 40 to an adjacent drive assembly. Specifically, a single belt 68 extends from sheave 50 of rearmost drive assembly 36 to sheave 58a of the adjacent (first) intermediate drive assembly 38. A different belt 68 extends from sheave 58b of that (first) intermediate drive assembly 38 to sheave 58b of the next adjacent (second) intermediate drive assembly 38. This (second) intermediate drive assembly 38 is interconnected by a single belt that extends between sheave 58a of that (second) intermediate drive assembly 38 to sheave 58a of the next (third) adjacent intermediate drive assembly 38. This continues for each intermediate drive assembly 38. The last or forwardmost intermediate drive assembly 38 has a single belt 68 that interconnects one of its sheaves 58a, 58b to the single sheave 58 on forwardmost drive assembly 40. Belts 68 enable the rotation of drive shaft 46 of rearmost drive assembly 36 to be translated into rotation of each shaft 54 of intermediate drive assemblies 38 and shaft 54 of forwardmost drive assembly 40. Thus, rotation of motor 44 is translated into a rotation of all of the drive shafts 46, 54 of all of the drive assemblies 36, 38, 40. The rotation of these drive shafts causes the associated drive wheels 48, 56 to also rotate and enables drive system 20 to move roof 24 between the extended and stowed positions, as described below.

Each drive assembly 36, 38, 40 also includes a tensioning device 70 (shown in FIGS. 3 and 4) spaced directly above each drive wheel 48, 56. Tensioning devices 70 are operable to bias roof 24 into engagement with the associated drive wheel 48, 56, as described below. Each tensioning device 70 includes a spring 72, such as a leaf spring as shown, that is attached to rail 26. A connecting arm 74 interconnects spring 72 with a cylindrical roller 76. Roller 76 is operable to rotate on connecting arm 74. Spring 72 biases roller 76 to a position that is slightly spaced apart from the associated drive wheel 48, 56. Spring 72 allows roller 76 to move away from and toward rail 26 as roof 24 is being moved between the extended and stowed positions. Roller 76 rides along a surface of roof 24 opposite the surface that drive wheels 48, 56 engage. The thickness between these opposite roof surfaces is greater than the distance between roller 76 and the associated drive wheel 48, 56. This allows tensioning device 70 to bias roof 24 toward the associated drive wheel 48, 56 when roof 24 is therebetween.

Figure 4:
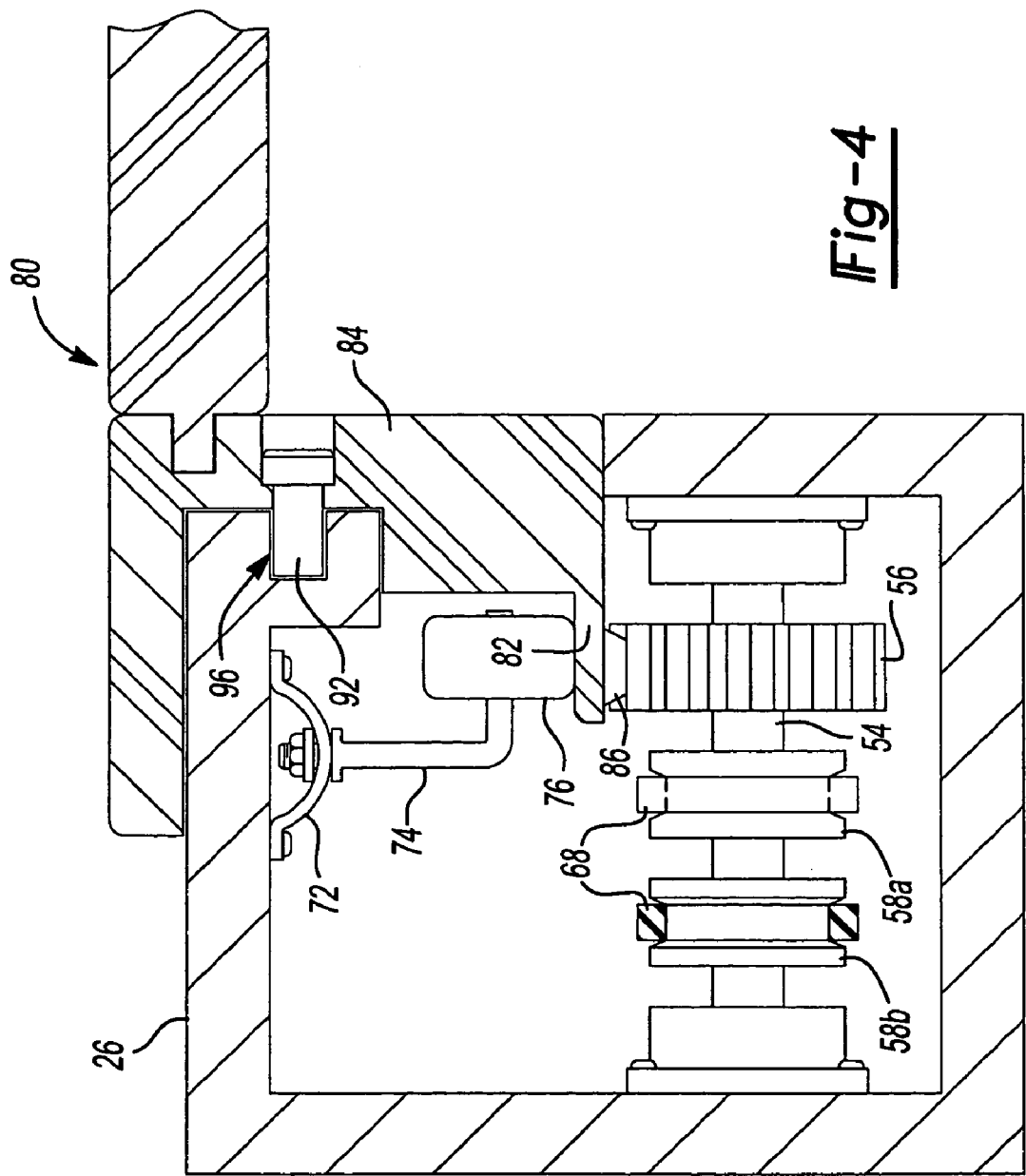
FIG. 4 is a fragmented cutaway view of the movable roof drive system along line 4-4 of FIG. 1B showing the engagement of the roof member with the movable roof drive system.

Still referring to FIGS. 3 and 4, roof 24 includes a top or exterior surface 80 that is visible from an exterior of vehicle 22 when in the extended position. Top surface 80 may cover none, a portion, or an entirety of the top surface of rails 26. Furthermore, it should be appreciated that rails 26 may include finishing pieces or trim that provide a desired exterior appearance for rails 26 and roof 24. Each side (driver and passenger) of roof 24 includes a lower engaging portion 82 that is configured to engage with drive wheels 48, 56 and tensioning device 70. A connecting member 84 connects the top portion 80 and engaging portion 82 of roof 24 together.

On the lower surface of engaging portion 82, as best seen in FIG. 3, a series of projections 86 and recesses 88 therebetween extend longitudinally. Projections 86 and recesses 88 can be integral (as shown) to engaging portion 82 or a separate distinct component that is attached to engaging portion 82. For example, a metal, rubber or polymeric strip having projections 86 and recesses 88 thereon can be attached to engaging portion 82 along the length of roof 24. Projections 86 and recesses 88 are complementary to teeth 62 and recesses 64 in drive wheels 48, 56. This enables drive wheels 48, 56 to engage with roof 24 and translate the rotation of the drive wheels 48, 56 into movement of roof 24 between the extended and retracted positions.

Connecting member 84 includes an alignment pin 92 that rides along a complementary recess or slot 96 that extends longitudinally along the length of rail 26. A leading edge 98 of engaging portion 82 is tapered to facilitate roof 24 moving into engagement with a drive wheel and tensioning device as roof 24 is moved from the stowed position to the extended position.

Drive system 20 also includes numerous sensors (not shown) that are operable to communicate the position of roof 24 to a controller (not shown). The controller uses the sensor information used to stop the extension or retraction of roof 24 when a desired position, such as fully extended or stowed, occurs. Additionally, drive system 20 includes a user operated switch (not shown) in the interior of vehicle 22 that enables the operator to activate and control drive system 20. For example, a simple open/close switch can be employed to cause motor 44 to operate and move roof 24 between the extended and stowed positions depending upon the position of the switch. If desired, a sliding switch can be employed that causes roof 24 to move between the extended and stowed positions in proportion to the distance the switch has been slid between two positions. It should be appreciated, however, that other switches and/or sensors can be employed or used to provide a desired functionality and control for drive system 20 and roof 24.

In operation, roof 24 is moved from the extended position, shown in FIG. 1A, to the retracted position, shown in FIG. 1C, through intermediate positions, such as that shown in FIG. 1B. To accomplish this, the switch for drive system 20 inside vehicle 22 is activated and the controller commands motor 44 to rotate in a direction that corresponds to moving roof 24 from the extended position to the retracted position. Motor 44 in turn rotates drive shaft 46 which rotates drive wheel 48 and sheave 50 of rearmost drive assembly 36. The rotation of sheave 50 is transferred to each of the sheaves 58a, 58b, shaft 54 and drive wheels 56 of intermediate drive assemblies 38 via belts 68. Contemporaneously, shaft 54, drive wheel 56 and sheave 58 of forwardmost drive assembly 40 is also caused to rotate via one of the belts 68. Drive wheels 48, 56 are engaged with projections 86 of roof 24 at least partially due to the biasing of tensioning devices 70. Rotation of drive wheels 48, 56 is translated via the interaction of teeth 62 and projections 86 into movement of roof 24 toward the retracted position. The rearmost portion of roof 24 settles into the lower portion of stowage compartment 28 and begins to fold upon itself as roof 24 is further retracted into stowage compartment 28. As the leading edge 98 of roof 24 disengages from forwardmost drive assembly 40 and subsequently from intermediate drive assemblies 38, the associated drive wheel 56 continues to rotate while not being engaged with roof 24. Tensioning devices 70 will be spaced apart from the associated drive wheel 56, as shown in FIG. 3. Motor 44 continues to operate until roof 24 has reached the position dictated by the switch (an intermediate position or a fully stowed position).

When in the fully retracted position, leading edge 98 remains engaged with rearmost drive assembly 36. This facilitates the subsequent extension of roof 24, as described below. During the retraction process, alignment pin 92 helps maintain the position of roof 24 relative to roof rails 26. As roof 24 is retracted into stowage compartment 28. Roof 24 folds upon itself due to the presence of living hinges, reduced areas of thickness, internal hinge-like mechanisms or the like, as stated above. Once the desired position of roof 24 has been achieved, motor 44 ceases to operate and, as a result, movement of roof 24 also ceases.

To move roof 24 from the retracted position to the stowed position, motor 44 is commanded to rotate in the opposite direction as used to retract roof 24. Rotation of drive motor 44 is translated via belts 68 and the associated sheaves 50, 58 into rotation of the drive wheels 56 associated with intermediate drive assemblies 38 and forwardmost drive assembly 40 along with rotation of drive wheel 48. With leading edge 98 engaged with rearmost drive assembly 36, the rotation of drive wheel 48 causes forward movement of roof 24 toward the extended position. Pin 92 helps guide the movement of roof 24 relative to roof rails 26 during the extension process. As roof 24 advances toward the fully-extended position, leading edge 98 will continue to encounter subsequent intermediate drive assemblies 38 and eventually forwardmost drive assembly 40. As leading edge 98 comes into engagement with one of the drive assemblies 38, 40 the tapered portion of leading edge 98 contacts roller 76 of tensioning device 70. The biasing of tensioning device 70 pushes roof 24 toward drive wheel 56. Once roof 24 has advanced sufficiently into intermediate drive assembly 38, teeth 62 of drive wheel 56 engage with projections 86 of roof 24 and begin to drive continued forward movement of roof 24 toward the extended position. As leading edge 98 engages with intermediate drive assembly 38, tensioning device 70 will be pushed upwardly by top surface of engaging portion 82. Motor 44 continues to operate until roof 24 has reached either its commanded position (an intermediate position or fully extended position). When this occurs, rotation of motor 44 ceases which in turn ceases the movement of roof 24.

Thus, with the drive system 20 of the present invention, roof 24 can be moved between extended and retracted positions or adjusted to an infinite number of positions therebetween. Drive system 20 is relatively simple in construction using a plurality of repeating drive assemblies that are spaced apart along roof rails 26. The drive assemblies are substantially contained within the perimeter of roof rails 26 to provide a compact drive system. The use of multiple single belts to transfer power from one drive assembly to the next reduces the amount of friction associated with using a single belt to drive all of the drive assemblies and, as a result, reduces the power requirements for a motor 44 used to drive drive system 20. Furthermore, the operation of drive system 20 is relatively simple. Accordingly, drive system 20 advantageously provides a drive system that can be used to move movable roof members between extreme positions.

Referring now to FIG. 5, an alternate embodiment of a drive system according to the principles of the present invention is shown and referenced as 120. In this embodiment, drive system 120 is contained entirely in a top portion of a vehicle 122. That is, stowage compartment 128 is located in a roof portion of vehicle 122. Additionally, roof 124 rolls up upon itself within stowage compartment 128. That is, as shown in FIG. 5, roof 124 is in an intermediate position between the extended and retracted positions. Within stowage compartment 128 is an elongated rod 199 upon which roof 124 rolls up upon itself. Rod 199 is biased by a torsion spring to pull roof 124 into stowage compartment 128 and roll up upon itself. In this embodiment, roof 124 is substantially entirely pliable so that it may be rolled upon itself. The use of battens, however, is still possible as long as the battens extend primarily transversely along the roof 124 and do not inhibit the rolling of roof 124 upon itself.

With this configuration, the backlight 130 of vehicle 122 can be a separate component from roof 124. Furthermore, backlight 130 can be moved vertically from an extended position, as shown in FIG. 5 wherein backlight 130 is partially disposed and seals against the lower portion of stowage compartment 128, to a retracted position (not shown) within the rearmost panel of vehicle 122. Thus, a drive system according to the principles of the present invention can roll the movable roof member upon itself, and/or position the stowage compartment 128 for the movable roof member in a variety of places on a vehicle 122.

While the drive system of the present invention has been shown and explained by reference to two different embodiments, it should be appreciated that these embodiments are exemplary of the drive system of the present invention and that variations and departures from those shown can be employed while still being within the scope of the present invention. For example, motor 44 while being stated as being an electrical motor could be a hydraulic motor or other type of motor. Moreover, other types of drive devices can be used to impart rotation to drive shaft 46 of the rearmost drive assembly 36. Furthermore, each belt 68 could be used to drive more than one sheave and the associated drive wheel, if desired, although all of the benefits of the present invention may not be realized. Additionally, while movable roof member 24 is shown as being retracted only toward the rear of the vehicle, it should be appreciated that the movable roof member could be retracted into and/or toward a front portion of the vehicle. Moreover, it should also be appreciated that two motors and drive systems could be employed to cause the movable roof member to be bunched together and fold upon itself in a central portion of the vehicle thus enabling independent control of a front portion of the movable roof member and independent control of a rear portion of the movable roof member. The number and spacing of the various drive assemblies shown can also be varied for the particular design of vehicle 22 and the desired motion of the associated movable roof member. Still further, the use of a guide pin on the movable roof member is optional and may be removed for some designs and/or configurations. Moreover, while the tensioning device is shown as using a leaf spring, other types of springs, such as coil springs or other types of biasing members, such as elastomeric members can be employed to bias the roller toward an associated drive wheel.

Moreover, while roof rails 26 are shown as being fixed in place, the roof rails can be configured to fold or retract upon themselves while maintaining the various drive assemblies therein. Additionally, it should be appreciated that the configuration, shape and design of roof rails 26 is shown for exemplary purposes only and may vary from that shown. For example, roof rails 26 may include a variety of pieces, such as, by way of non-limiting example, C-shaped, L-shaped, and U-shaped channels, that are attached together to form a structure sufficient to act as a roof rail. Preferably, roof rails 26 are configured and shaped to facilitate the assembly of drive system 20 while providing the desired structural functions.

In still other embodiments, the drive system can be used to control the movement of movable roof member(s) that are not a pliable roof. For example, the drive system according to the principle of the present invention can be used to move a sunroof panel between extended and retracted positions. Moreover, the drive system of the present invention can also be used to move rigid roof panels that extend an entire width of the vehicle roof. It should be appreciated, however, that when the drive system is used to move substantially rigid sunroof panels or rigid roof panels, these panels might not be folded upon themselves. Rather, the panels may be moved to a desired stowage position either above or below existing structures and/or stowed either horizontally or vertically or a combination of both. Moreover, if multiple movable panels are employed, the panels can be arranged to stack upon themselves when being retracted and then move into planar alignment with one another when being moved to the extended position. Thus, it should be appreciated that the preceding description of the invention is merely exemplary in nature and variations that do not depart from the gist of the invention are intended to be within the scope of the invention. Such variations are not to be regarded as a departure from the sphere and scope of the invention.

What is claimed is:

1. An automotive vehicle system comprising:
    a movable member operable between first and second positions, the first position corresponding to at least a majority of the movable member being above a beltline of the vehicle;
    at least one drive wheel operable to engage and disengage with the movable member and cause the movable member to move between the first and second positions; and
    at least one belt coupled to the at least one drive wheel, the at least one belt operable to drive rotation of the at least one drive wheel.

2. The automotive vehicle system of claim 1, wherein the movable member is a roof member.

3. The automotive vehicle system of claim 2, wherein the roof member is a pliable roof member.

4. The automotive vehicle system of claim 1, wherein the at least one drive wheel is one of a plurality of drive wheels each operable to engage with and move the movable member and the at least one belt is one of a plurality of belts each coupled to at least two of the drive wheels.

5. The automotive vehicle system of claim 4, wherein each of the belts is coupled to only two of the drive wheels.

6. The automotive vehicle system of claim 1, further comprising a motor and a drive shaft, the motor coupled to the drive shaft and operable to selectively rotate the drive shaft, the drive shaft coupled to the at least one belt and operable to cause the at least one belt to drive the at least one wheel.

7. The automotive vehicle system of claim 1, wherein the movable member is folded upon itself when in the second position.

8. A retractable roof system comprising:
    a roof member operable between extended and retracted positions;
    a pair of opposing roof rails between which the roof member extends when in the extended position;
    a plurality of intermediate wheels disposed in each of the roof rails, each intermediate wheel operable to engage and disengage with the roof member and each intermediate wheel operable to selectively drive the roof member between the extended and retracted positions when engaged therewith;
    a permanent drive wheel in each roof rail, the permanent drive wheels always being engaged with the roof member and operable to selectively drive the roof member between the extended and retracted positions; and
    a plurality of elongated flexible coupling members interconnecting the intermediate wheels and the permanent drive wheels, the coupling members transmitting rotation of one of the wheels into rotation of at least an adjacent wheel.

9. The retractable roof system of claim 8, further comprising a plurality of tensioning members each operable to bias the roof member toward an associated wheel.

10. A method of moving a roof member between first and second positions, the method comprising:
    (a) rotating a plurality of spaced apart wheels with at least one belt that couples the wheels together;
    (b) moving the roof member between the first and second positions with rotating wheels that are engaged with the roof member;
    (c) disengaging some of the wheels from the roof member as the roof member is moved from the first position to the second position; and
    (d) engaging previously disengaged wheels with the roof member as the roof member is moved from the second position to the first position.

11. The method of claim 10, further comprising biasing the roof member toward the wheels.

12. The method of claim 11, further comprising biasing the roof member toward the wheels with spring biased rollers that are across from the wheels and engage with an opposite surface of the roof member than the wheels.

13. The method of claim 10, wherein a sheave is coupled to the at least one belt and (a) includes rotating the sheave with a motor coupled to the sheave.

14. The method of claim 13, wherein (a) includes rotating a first one of the wheels with a first belt that couples the sheave and the first wheel together and rotating a second one of the wheels with a second belt that couples the first and second wheels together.

15. The method of claim 10, wherein engaging a wheel with the cover includes engaging projections on the roof cover with recesses in the wheel.

16. The method of claim 10, wherein at least a portion of the roof member is pliable and further comprising folding the roof member upon itself when in the second position.

17. The method of claim 10, wherein at least a portion of the roof member is pliable and further comprising rolling the roof member up as the roof member moves from the first position to the second position.

* * * * *